US011743379B2

(12) United States Patent
Jensen

(10) Patent No.: US 11,743,379 B2
(45) Date of Patent: Aug. 29, 2023

(54) EMERGENCY DATA GATEWAY DEVICE

(71) Applicant: RapidDeploy, Inc., Austin, TX (US)

(72) Inventor: Justin Jensen, Seguin, TX (US)

(73) Assignee: RapidDeploy, Inc., Austin, TX (US)

( * ) Notice: Subject to any disclaimer, the term of this patent is extended or adjusted under 35 U.S.C. 154(b) by 0 days.

(21) Appl. No.: 18/072,399

(22) Filed: Nov. 30, 2022

(65) Prior Publication Data
US 2023/0093284 A1 Mar. 23, 2023

Related U.S. Application Data

(63) Continuation of application No. 17/245,058, filed on Apr. 30, 2021, now Pat. No. 11,539,839, which is a
(Continued)

(51) Int. Cl.
*H04M 11/04* (2006.01)
*H04M 3/51* (2006.01)
*H04L 12/66* (2006.01)
*H04W 76/50* (2018.01)
*H04L 65/102* (2022.01)
*H04L 65/1046* (2022.01)
*H04L 65/1033* (2022.01)
*H04L 65/1053* (2022.01)
(Continued)

(52) U.S. Cl.
CPC .......... *H04M 3/5116* (2013.01); *H04L 12/66* (2013.01); *H04L 65/102* (2013.01); *H04L 65/1033* (2013.01); *H04L 65/1046* (2013.01); *H04L 65/1053* (2013.01); *H04M 7/1205* (2013.01); *H04W 76/50* (2018.02); *H04M 2242/04* (2013.01); *H04W 4/90* (2018.02)

(58) Field of Classification Search
CPC ............ H04M 3/5116; H04M 7/1205; H04M 2242/04; H04L 12/66; H04L 65/102; H04L 65/1033; H04L 65/1046; H04L 65/1053; H04L 67/565; H04L 69/22; H04W 76/50; H04W 4/90
USPC ...................................................... 455/404.1
See application file for complete search history.

(56) References Cited

U.S. PATENT DOCUMENTS 8,346,563 B1 * 1/2013 Hjelm ................. G10L 15/1822
704/251
8,910,299 B2 * 12/2014 Michalske ........ H04M 1/72424
726/16

(Continued)

*Primary Examiner* — Amancio Gonzalez
(74) *Attorney, Agent, or Firm* — Patent Capital Group

(57) ABSTRACT

A gateway device includes a call handling equipment (CHE) listener interface, an Internet Protocol (IP) interface, a provisioning engine, and a message parsing engine. The CPE listener interface forms a communication channel with a CHE and receives call event data from the CHE. The IP interface communicates with a cloud-based processing system. The provisioning engine receives, from the cloud-based processing system via the IP interface, instructions for parsing data from a data output format of the CHE into a consistent data format of the cloud-based processing system. The message parsing engine parses the call event data received from the CHE via the CHE listener interface, and formats the call event data according to the consistent data format. The gateway device transmits the formatted call event data to the cloud-based processing system via the IP interface.

20 Claims, 4 Drawing Sheets

Related U.S. Application Data continuation of application No. 16/742,255, filed on Jan. 14, 2020, now Pat. No. 10,999,432, which is a continuation of application No. 16/289,432, filed on Feb. 28, 2019, now Pat. No. 10,582,053, which is a continuation of application No. 16/179,795, filed on Nov. 2, 2018, now Pat. No. 10,264,122.

(60) Provisional application No. 62/678,845, filed on May 31, 2018.

(51) Int. Cl.
*H04M 7/12* (2006.01)
*H04W 4/90* (2018.01)

(56) References Cited

U.S. PATENT DOCUMENTS

| | | | | |
|---|---|---|---|---|
| 9,307,081 B2 * | 4/2016 | Ray | | H04M 3/5116 |
| 9,602,987 B1 * | 3/2017 | Wittig | | H04W 4/14 |
| 10,158,548 B2 * | 12/2018 | Naar | | H04M 15/09 |
| 10,264,122 B1 * | 4/2019 | Jensen | | H04W 76/50 |
| 10,582,053 B2 * | 3/2020 | Jensen | | H04L 65/1046 |
| 10,610,111 B1 * | 4/2020 | Tran | | A61B 5/411 |
| 10,686,743 B1 * | 6/2020 | Coen | | G06F 16/907 |
| 10,999,432 B2 * | 5/2021 | Jensen | | H04L 69/22 |
| 11,539,839 B2 * | 12/2022 | Jensen | | H04L 65/1053 |
| 2007/0226314 A1 * | 9/2007 | Eick | | G06F 16/986 709/217 |
| 2009/0031006 A1 * | 1/2009 | Johnson | | H04M 3/42348 709/218 |
| 2012/0089920 A1 * | 4/2012 | Eick | | G06T 11/206 715/739 |
| 2013/0290234 A1 * | 10/2013 | Harris | | G06Q 30/00 901/50 |
| 2013/0339099 A1 * | 12/2013 | Aidroos | | G06Q 50/01 705/7.36 |
| 2014/0142963 A1 * | 5/2014 | Hill | | G16H 10/60 705/2 |
| 2015/0199088 A1 * | 7/2015 | Chandaria | | G06F 30/39 715/763 |
| 2018/0113006 A1 * | 4/2018 | Tyrer | | G08B 21/0492 |
| 2018/0211509 A1 * | 7/2018 | Ramaci | | A61J 7/0481 |
| 2018/0260813 A1 * | 9/2018 | Pi Farias | | G06Q 30/018 |

* cited by examiner

EMERGENCY DATA GATEWAY DEVICE

CROSS REFERENCE TO RELATED APPLICATIONS

This application is a continuation of U.S. application Ser. No. 17/245,058, filed Apr. 30, 2021; which is a continuation of U.S. application Ser. No. 16/742,255, filed Jan. 14, 2020, and issued as U.S. Pat. No. 10,999,432; which is a continuation of U.S. application Ser. No. 16/289,432, filed Feb. 28, 2019, and issued as U.S. Pat. No. 10,528,053; which is a continuation of U.S. application Ser. No. 16/179,795, filed Nov. 2, 2018, and issued as U.S. Pat. No. 10,264,122; which claims the benefit of and priority to U.S. Provisional Application No. 62/678,845, filed May 31, 2018; all of which are incorporated by reference in their entireties.

BACKGROUND

Public Safety Answering Points (PSAPs) receive emergency calls from the legacy time division multiplexing (TDM)-based Selective Router (SR) network and NG9-1-1 Emergency Services IP Network (ESInet). These calls terminate to 911 Customer Premises Equipment (CPE) systems or other call handling systems that distribute the calls to dispatchers. Capable CPE systems provide telemetry information for incoming emergency calls, such as various forms of emergency caller location information, call routing actions, Automatic Call Distribution (ACD) events, etc. CPE systems traditionally interface with on-site call taking and computer-aided dispatch (CAD) applications, which operate on servers in the PSAP and connect directly to the CPE system over the local network. The 911 industry is moving towards using Internet Protocol (IP) based communications, such as voice over IP (VoIP). However, with over 6000 PSAPs operating in the United States alone, the changeover to fully IP-based PSAPs is expected to take many years. As the public safety industry at large transitions to IP-based technology that is deployed to private, public, and hybrid cloud infrastructure, interim solutions can bridge the gap to legacy premise-based equipment.

Because each CPE system is a stand-alone, custom-built system, there is a large amount of variation in existing CPE systems across the 6000+ PSAPs in the United States. For example, many different proprietary data formats are used across different CPE systems to structure emergency call-related data. Cloud-based call taking and CAD solutions are being developed, such as RapidDeploy's CAD platform. Cloud-based call taking and CAD offers several improvements over traditional on-premises call-taking and CAD systems, including the ability to quickly deploy new features and updates to all users, less on-site infrastructure, and increased immunity to malware attacks. However, cloud-based call-taking and dispatch solutions are typically IP-based, making it challenging to connect to legacy, non-IP-based CPE systems.

SUMMARY

A gateway device connects existing call handling equipment (CHE) to cloud-based CAD systems. The gateway device allows PSAPs to integrate current CPE systems and other types of CHE to modern emergency dispatch applications, such as cloud-based call taking and CAD providers (referred to jointly as CAD providers). The gateway device is configured to connect to a CHE, receive emergency call data in the data output format used by the CHE, parse and reformat the received data into a structured format used by a cloud-based CAD provider, and transmit the reformatted data over an IP network to a server of the CAD provider. The gateway device connects to a secure network, such as Microsoft Azure Government, providing a reliable transmission of events received from the CHE to the cloud-based CAD provider.

The CAD provider synchronizes with and monitors the status of the gateway devices to which it is connected. Each gateway device may provide the cloud-based CAD provider with an inventory of on premise CHE to which it is connected, and provide and status updates about the connected CHE, so that the CAD provider can monitor the status of the CHE and provide alerts to PSAPs about potential issues. In some embodiments, the cloud-based CAD provider can remotely and efficiently reconfigure one or more of the gateway devices. For example, the CAD provider can push a software update to all of the connected gateway devices at once.

In some embodiments, the CAD provider may perform on-demand provisioning when a new gateway device is connected to the network. As explained above, the format of emergency call data provided by CHE is not standardized, so the data format varies between different CHE vendors and products. Advantageously, because the gateway devices are network connected, each gateway device does not need to be manually programmed based on the output data format of the CHE. Instead, the CAD provider may store instructions for parsing each output data format used by a CHE vendor or product, and push the appropriate instructions to a gateway device based on the type of CHE to which it is connected. The instructions for parsing a given call data format are only programmed one time (i.e., for the first gateway device that receives data in a given data output format), and the instructions are then automatically provided to additional gateway devices that receive data in the same output data format.

In an embodiment, a gateway device includes a call handling equipment (CHE) listener interface, an internet protocol (IP) interface, a provisioning engine, and a message parsing engine. The CHE listener interface is configured to form a communication channel with CHE and receive call event data from the CHE. The IP interface is configured to communicate with a cloud-based processing system. The provisioning engine is configured to receive, from the cloud-based processing system via the IP interface, instructions for parsing data from a data output format of the CHE. The message parsing engine is configured to parse the call event data received from the CHE via the CHE listener interface according to the instructions, and format the call event data according to a consistent data format. The gateway device is configured to transmit the formatted call event data to the cloud-based processing system via the IP interface.

In another embodiment, a gateway device performs a method for processing emergency call data. The gateway device receives call event data from call handling equipment (CHE) in communication with the gateway device. The gateway device parses the received call event data based on parsing instructions for parsing data from a data output format of the CHE server. The gateway device formats the parsed call event data according to a consistent data format used by a cloud-based processing system according to formatting instructions. The gateway device transmits the formatted call event data to the cloud-based processing system via an IP interface.

In another embodiment, a cloud-based processing system performs a method for provisioning a gateway device. The system receives, from the gateway device over an Internet connection, data describing a local environment of the gateway device. The environment includes call handling equipment (CHE) configured to provide emergency call data. The system determines an output data format of a plurality of data formats for the CHE based on the data describing the local environment. The system retrieves instructions for parsing data from the output data format and formatting the parsed data in a consistent format, and transmits the instructions to the gateway device over the Internet connection.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
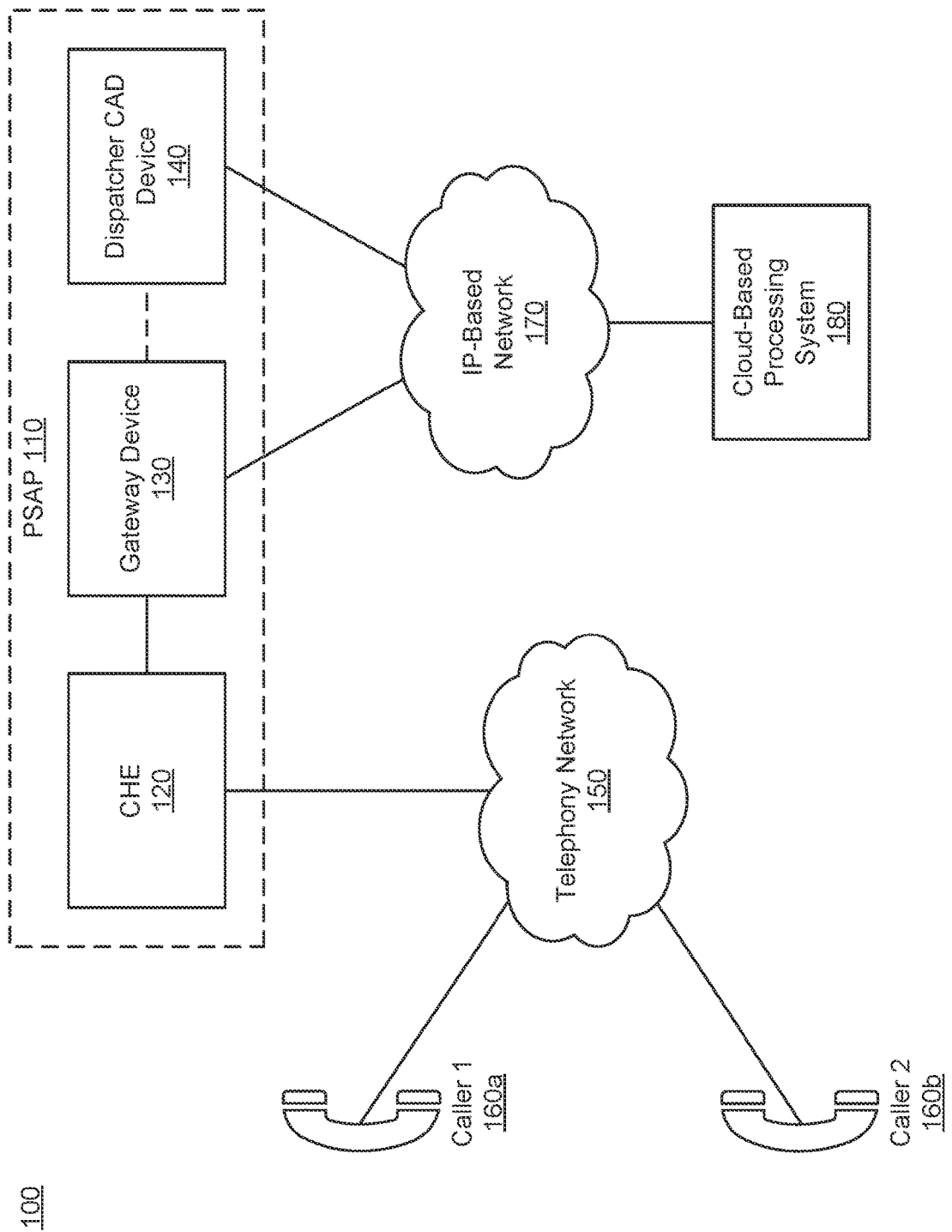
FIG. 1 is an emergency call taking and dispatch environment including a gateway device, according to an embodiment.

FIG. 1 is an emergency call taking and dispatch environment 100 including a gateway device, according to an embodiment. The environment 100 includes call handling equipment (CHE) 120, a gateway device 130, a dispatcher CAD device 140, a telephony network 150, two callers 160, an IP-based network 170, and a cloud-based computer-aided dispatch (CAD) system 180. In this embodiment, the CHE 120, gateway device 130, and dispatcher CAD device 140 are all located within a public safety answering point (PSAP) 110. In some embodiments, the CHE 120 is located off-site and connected to a private network of the PSAP 110, and the gateway device 130 is located with and connected to the CHE 120. In alternative configurations, different and/or additional components may be included in the system environment 100, or the locations and connections between components may differ. Additionally, functionality described in conjunction with one or more of the components shown in FIG. 1 may be distributed among the components in a different manner than described in conjunction with FIG. 1 in some embodiments.

The PSAP 110 is an emergency call taking center. PSAPs typically include telephony infrastructure for receiving emergency calls and routing the calls to dispatchers working at the PSAP. PSAPs also include dispatch equipment that dispatchers use to communicate information about the emergency calls to appropriate first responders (e.g., police, fire, or medical responders). CHE 120 is the call handling equipment located on-site in the PSAP 110 or connected to a private network of the PSAP 110. CHE 120 can include various hardware devices, such as servers, routers, and switches, for supporting delivery of emergency calls to dispatchers. In some embodiments, CHE includes customer premises equipment (CPE). For example, one or more CPE servers connect the PSAP 110 to the telephony network 150, and handle and process telephony aspects of emergency calls. In addition to CPE servers, CPE can also include various other devices located within the PSAP 110, such as routers and telephony switching systems used by dispatchers to receive calls. In other embodiments, CHE 120 may include Next Generation Core Services (NGCS) equipment or other types of Functional Elements (FE) or systems that support delivery of Next Generation 9-1-1 (NG911) emergency calls.

The telephony network 150 is a network that connects callers 160 making emergency calls to PSAPs 110. For example, the telephony network 150 may be the legacy selective router (LSR) network or some other component of the public switched telephony network (PSTN). Within the telephony network 150, a call from a caller, such as caller 160*a* or caller 160*b*, may be routed to a particular PSAP 110 by a routing facility based on the location of the caller. The call routing may be handled by an Enhanced 911 (E911) system or NG911 system.

The callers 160*a* and 160*b* use any device enabled for voice calls to connect to the PSAP 110. For example, the callers 160 may connect to the telephony network 150 using landline phones, mobile phones, voice over IP (VoIP) phones, etc. The callers 160 access the PSAP 110 by dialing a standard emergency number, such as 911 in the United States or 112 in the European Union. While two callers 160 are shown in FIG. 1, it should be understood that the PSAP 110 typically handles calls for a region (e.g., a city, county, or state) that includes many more potential callers, e.g., thousands or millions of callers. Furthermore, the PSAP 110 may be configured to handle emergency calls from more than two callers 160 simultaneously.

The CHE 120 receives and handles incoming calls from the telephony network 150. For example, as shown in FIG. 1, the CHE 120 receives voice calls from caller 160*a* and caller 160*b* via the telephony network 150. The CHE 120 creates a call event for each received call. As used herein, a call event is an event within an emergency dispatch system (e.g., the CHE 120 and connected systems, such as the gateway device 130 and cloud-based processing system 180) that describes an emergency call session created by the CHE 120 in response to receiving an emergency call from a caller 160. The CHE 120 routes each received voice call to a dispatcher phone system (not shown in FIG. 1), which is typically within the PSAP 110. In addition, the CHE 120 extracts metadata describing the call event, such as the phone number of the caller 160, the name of the caller 160, the telephone service provider of the caller 160, and the location of the caller 160. The CHE 120 structures and outputs the metadata describing the call event, typically via a wired connection. The CHE 120 may output the metadata in one or more of a variety of output data formats, such as Automatic Location Information (ALI), Call Detail Report (CDR), or National Emergency Number Association (NENA) i3 Logging.

The gateway device 130 connects to the CHE 120, receives the call metadata output by the CHE 120, and provides the metadata to the cloud-based processing system 180. The gateway device 130 is programmed to parse the metadata in the output data format of the CHE 120 and format the parsed metadata into a consistent data format recognized by the cloud-based processing system 180. The metadata is by the gateway device 130 into cloud-friendly format, such as JSON. Using a consistent format allows the cloud-based processing system 180 to store, index, and search the metadata in a distributed cloud environment.

The gateway device 130 may be implemented as a system on a chip (SoC) built using low cost, off-the-shelf hardware, such as a system based on an ARM or x86 processor architecture. The gateway device 130 may execute an operating system that is compatible with the cloud-based processing system 180 for greater compatibility with the cloud-based processing system 180. For example, the gateway device 130 uses a Microsoft IoT platform, such as Windows 10 IoT Core, and the cloud-based processing system 180 runs Microsoft Azure Government cloud.

The gateway device 130 includes one or more physical ports for connecting to one or more devices of the CHE 120. For example, the gateway device 130 includes a DB9 DTE serial interface and an RJ-45 Ethernet. The gateway device 130 may be configured to receive data encapsulated and transported by one or more protocols, such as HTTP, SOAP/XML, TCP socket, or EIA/TIA RS-232. In some embodiments, the gateway device 130 has two or more physical ports to connect to and receive data from two or more CHE devices (e.g., two or more CPE servers) simultaneously. In other embodiments, if the PSAP 110 has two or more CHE devices for call handling, a different gateway device 130 may be connected to each device.

The gateway device 130 is an Internet-enabled device, also referred to as an Internet of Things (IoT) device. The gateway device 130 connects to the cloud-based processing system 180 via an IP-based network 170. The gateway device 130 includes one or more high-bandwidth IP interfaces, which may be wired (e.g., Ethernet) or wireless connections. The gateway device 130 may include one primary IP interface and one or more backup IP interfaces (e.g., one wired connection and one wireless connection) for increased reliability. In some embodiments, the gateway device 130 may segment network traffic between multiple IP interfaces. The gateway device 130 is described in greater detail with respect to FIG. 2.

The IP-based network 170 is a network that connects the cloud-based processing system 180 to equipment, including the gateway device 130 and dispatcher CAD device 140, at various PSAPs, such as PSAP 110. The IP-based network 170 is network over which devices transmit and receive communications using Internet Protocol. The IP-based network 170 may include a secure Internet connection to which the gateway device 130 and dispatcher CAD device 140 connect to the cloud-based processing system 180, such as connection to the Microsoft Azure Government cloud computing platform. Although only one PSAP 110 is shown in FIG. 1, many such PSAPs 110 may connect to the cloud-based processing system 180 via the IP-based network 170.

The cloud-based processing system 180 receives the formatted metadata generated by the gateway device 130 based on the metadata received from the CHE 120, and processes the received formatted metadata. In one embodiment, the cloud-based processing system 180 is a call analytics system that performs analysis on received emergency calls based on the information received from one or more gateway devices. In another embodiment, the cloud-based processing system 180 is a cloud-based computer aided dispatch (CAD) system that manages a CAD service that provides information about emergency calls and first responders to dispatchers, and enables dispatchers to connect to first responders and dispatch first responders to the locations of emergencies. In this embodiment, the cloud-based CAD system connects to the gateway device 130 and to a dispatcher CAD device 140 located at the PSAP 110 via the IP-based network 170. The cloud-based CAD system processes the received data from the gateway device 130 and provides information about a caller 160 to the dispatcher CAD device 140 for display to a dispatcher. The cloud-based CAD system may provide a web interface to the dispatcher CAD device 140, e.g., in website accessed by a browser executing on the dispatcher CAD device 140. The cloud-based CAD system may also receive information from the dispatcher CAD device 140 input by the dispatcher, e.g., additional information about a caller 160, selections for responding to the call, information about first responders who were dispatched, etc.

The cloud-based processing system 180 may store information received from the gateway device 130 (and, optionally, dispatcher CAD device 140) and performs analytics to assess the health and operation of the cloud-based processing system 180 and its connected PSAPs 110. For example, the cloud-based processing system 180 monitors the operations of the CHE 120 and the gateway device 130, and may alert PSAPs 110 to any potential issues.

The cloud-based processing system 180 is implemented by one or more highly secure and reliable servers. For example, the cloud-based processing system 180 may operate on the Microsoft Azure Government cloud. An example of a cloud-based CAD system, which is one implementation of the cloud-based processing system 180, is described in greater detail with respect to FIG. 3.

The dispatcher CAD device 140 is a computer system operated by a dispatcher on-site at the PSAP 110. Typical dispatcher CAD devices 140 includes the hardware and software needed to display user interfaces, connect to the IP-based network 170, and detect user input. The dispatcher CAD device 140 includes an application that allows interaction with a cloud-based CAD system. The application may be a browser that allows a dispatcher to access a web-based CAD service provided by the cloud-based processing system 180. Alternatively, the application may be a dedicated application provided by the cloud-based processing system 180 to enable interactions with the cloud-based processing system 180. In other embodiments, the cloud-based processing system 180 does not provide a web-based CAD service, and the dispatcher CAD device 140 obtains a CAD service through a different system.

In some embodiments, the dispatcher CAD device 140 receives some or all of the call event data about an emergency call received by the gateway device 130 via the cloud-based processing system 180. The dispatcher CAD device 140 is associated with a position number, which corresponds to the position number used by the CHE 120 to route calls to the dispatcher. The cloud-based processing system 180 uses this position number to provide relevant call information to a dispatcher CAD device 140, i.e., information relating to a call routed by the CHE 120 to the dispatcher using the dispatcher CAD device 140. In other embodiments, the dispatcher CAD device 140 has a direct connection to the gateway device 130. In such embodiments, the gateway device 130 has an additional output channel for providing real-time call event directly to the dispatcher CAD device 140, to ensure that on-site dispatchers receive the call event data. For example, the gateway device 130 may be configured to connect to an internal IP-based network over a wired or wireless connection, and transmit real time call event data to the dispatcher CAD device 140 over this internal network. In some embodiments, this internal network channel is a backup channel used if the connection to the cloud-based processing system 180 is disrupted; alternatively, the internal network channel may be used during standard operation. When call event data is transmitted over the internal network to a dispatchers, the gateway device 130 may use the position number to provide the call event data to the appropriate dispatcher CAD device 140.

Figure 2:
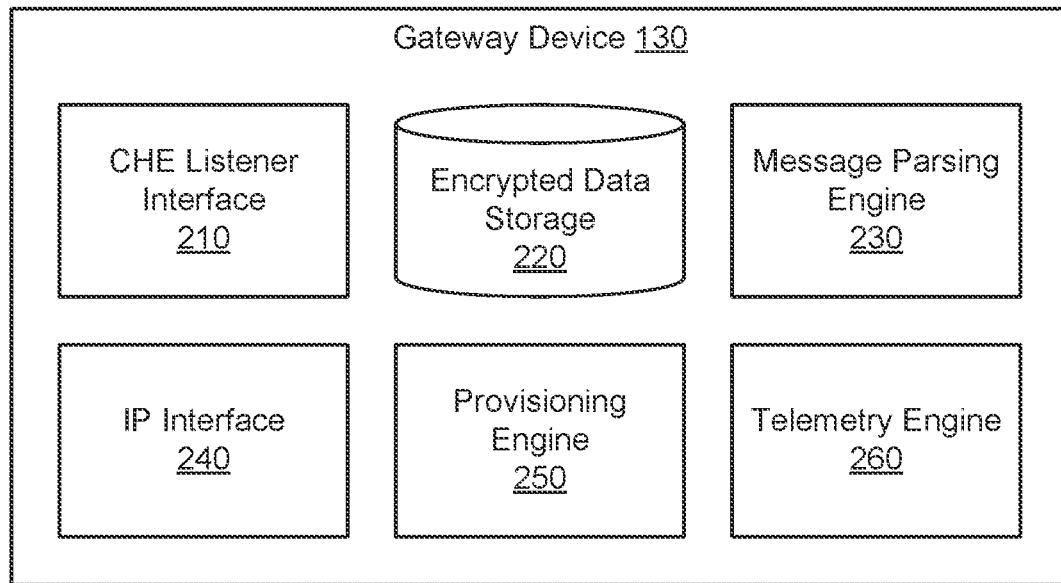
FIG. 2 is a block diagram of the gateway device, according to an embodiment.

FIG. 2 is a block diagram of the gateway device 130, according to an embodiment. The gateway device 130 includes a CHE listener interface 210, encrypted data storage 220, a message parsing engine 230, an IP interface 240, a provisioning engine 250, and a status engine 260. In alternative configurations, different and/or additional components may be included in the gateway device 130. Additionally, functionality described in conjunction with one or more of the components shown in FIG. 2 may be distributed among the components in a different manner than described in conjunction with FIG. 2 in some embodiments.

The CHE listener interface 210 is an interface that forms a communication channel with the CHE 120 and receives call event data from the CHE 120. The CHE listener interface 210 may include one or more serial ports, Ethernet ports, or other types of ports for connecting to the CHE 120. In some embodiments, the CHE listener interface 210 also includes circuitry configured to perform initial processing and storage of the call event data. The call event data may be received as a stream of distinct data messages, each data message corresponding to a particular caller 160. For example, a data message for an emergency call event includes the phone number, name, telephone service provider, and preliminary location information for a caller 160. The data message may also indicate the dispatcher to whom the CHE 120 has routed the call, e.g., the position number in the PSAP 110 of the dispatcher. The CHE 120 may also transmit follow-on data messages for the same emergency call event, e.g., to include an updated location for the caller 160. These follow-on messages may have the same formatting as the initial messages. The CHE listener interface 210 receives and stores the data messages for processing by the message parsing engine 230. In some embodiments, the CHE listener interface 210 generates a message identifier for each of the data messages, and stores each data message with its message identifier in a message queue. The message queue may be stored in the encrypted data storage 220.

In some embodiments, the CHE listener interface 210 is configured to receive call event data from two or more CHE devices. In such embodiments, the CHE listener interface 210 comprises two or more physical ports. As data messages are received at the physical ports, the CHE listener interface 210 stores data messages from each port in the encrypted data storage 220, e.g., in a single queue, or a queue for each CHE device, based on time of arrival at the gateway device 130.

The encrypted data storage 220 is a memory local to the gateway device 130 for storage of call event data, such as a queue of data messages. The encrypted data storage 220 stores data received from the CHE 120 in an encrypted format to provide data security.

The message parsing engine 230 retrieves call event data from the encrypted data storage 220, parses the data according to instructions for parsing the data from the data output format of the CHE 120, and formats the parsed data in a consistent format. If the data messages are stored in a queue, the message parsing engine 230 may retrieve data messages from the queue in a first-in-first-out (FIFO) order, so that messages are processed in the order that they are received. Data messages from different CHE systems typically include similar types of data, but the data messages may be encoded and formatted differently by different CHE systems. The message parsing engine 230 identifies and classifies parts of each data message based on the encoding and formatting of the connected CHE 120. The message parsing engine 230 then recombines the data parsed from the data message according to a consistent format that is recognized and understood by the cloud-based processing system 180. Each data message in the consistent format output by the message parsing engine 230 includes an identifier of the PSAP 110 at which the message was received, and an identifier of the dispatcher position to which the call associated with the message is routed.

As an example, a sample data message in the Automatic Location Identification (ALI) format, which is one format used by some CHE, is provided below. This format does not indicate the fields for the various message components, so this data message cannot be interpreted and analyzed unless the receiving device is specifically configured to parse data in the ALI format.

```
265
H1-000                      ESN=080      001
 (123) 456-7890 12:00 01/01/2018
   100
MAIN ST
                            123-4567 RESD
AUSTIN                                    TX
DOE, JOHN
ALT#=                            TELCO=SWBT
X=+30.263675                     CNF=
Y=-97.725412                     UNC:
AUSTIN PD
AUSTIN FD
```

An example of a reformatted data message in JSON format output by a gateway device 130 is provided below. The JSON format indicates the fields for each item in the data message, so the data message provided by the gateway device 130 can be easily understood and analyzed.

```
{
   "ContactNumber":  "1234567890",
   "City":  "AUSTIN",
   "ClassOfService":  "RESD",
   "StreetNumber":  "100",
   "Latitude":  "+30.263675",
   "Longitude":  "-97.725412",
   "ContactName":  "DOE, JOHN",
   "State":  "TX",
   "Street1":  "MAIN ST",
   "SourceDateTime":  "2018-01-01 12:00:00Z"
   "Telco":  "SWBT"
}
```

The IP interface 240 transmits data to and receives data from the cloud-based processing system 180 over the IP-based network 170. The IP interface 240 receives formatted data messages from the message parsing engine 230 and transmits these formatted messages to the cloud-based processing system 180 via the IP-based network 170. In particular, the IP interface 240 may connect to an event hub of the cloud-based processing system 180 that is configured to receive data describing call events from gateway devices. The IP interface 240 also receives data from the cloud-based processing system 180, such as configuration information and software updates. In addition, the provisioning engine 250 and the status engine 260 use the IP interface 240 to communicate with the cloud-based processing system 180, as described below.

The provisioning engine 250 configures the gateway device 130 to parse messages from a particular CHE 120. The provisioning engine 250 provides information describing the environment of the gateway device 130. This includes information describing the one or more CAD servers 120 to which the gateway device 130 are connected, and can include additional information, such information describing the dispatcher positions and the dispatcher CAD devices 140. In some embodiments, the provisioning engine 250 provides information about the CHE 120 to the cloud-based processing system 180 via the IP interface 240, and receives instructions for parsing the data output format of the CHE 120 from the cloud-based processing system 180 based on the information provided. The provisioning engine 250 also receives and implements periodic updates from the cloud-based processing system 180. For example, the cloud-based processing system 180 may push a software update to all connected gateway devices 130, or some subset of connected gateway devices 130, and the provisioning engine 250 of each gateway device 130 installs the software update.

As one example for initially configuring a gateway device 130, the provisioning engine 250 instructs the CHE listener interface 210 to receive configuration data from the CHE 120 and pass the configuration data to the provisioning engine 250. For example, the provisioning engine 250 instructs the CHE listener interface 210 to receive one or more data messages output by the CHE 120, e.g., one or more data messages output by the CHE 120 during one or more emergency calls. The provisioning engine 250 passes the received information from the CHE 120 to the cloud-based processing system 180, which determines the data output format of the CHE 120 based on the information. The cloud-based processing system 180 selects configuration instructions, including the message parsing instructions, for the gateway device 130 based on the determined data output format, and transmits the configuration instructions to the gateway device 130. Alternatively, an administrator at the cloud-based processing system 180 determines the data output format based on the information and selects the configuration instructions, which the cloud-based processing system transmits to the gateway device 130.

As another example for initially configuring a gateway device 130, the provisioning engine 250 provides a provisioning user interface that an administrator at the PSAP 110 can use to provide information about the CHE 120. The gateway device 130 may have an integrated display and input mechanism, or the gateway device 130 may be configured to connect to a display and input mechanism, such as a monitor, mouse, and keyboard. The provisioning user interface assists a user (e.g., an administrator in the PSAP 110) in configuring the gateway device 130 based on properties of the CHE 120. For example, the provisioning user interface may request that the administrator enter information describing the CHE at the PSAP, such as the number of CHE devices to which the gateway device 130 is connected; the vendor name, product line, and versioning information of the CHE; the number of dispatcher CAD devices 140 and the dispatcher position numbering; and any other information about the environment of the gateway device 130 used by the cloud-based processing system 180. The provisioning engine 250 and cloud-based processing system 180 may cooperate to generate the provisioning user interface; for example, the provisioning engine 250 passes data received from the provisioning user interface to the cloud-based processing system 180, and the cloud-based processing system 180 may provide follow-up questions or instructions to the provisioning engine 250 to display in the provisioning user interface.

As another example for initially configuring a gateway device 130, the cloud-based processing system 180 stores information about a PSAP environment, including one or more gateway devices 130 and connected CHE 120, before the gateway device 130 is installed at the PSAP 110. For example, when the PSAP 110 contracts with the cloud-based processing system 180 to provide CAD services, an administrator at the PSAP 110 may provide the cloud-based processing system 180 with information about the PSAP's CHE. In one embodiment, the administrator of the cloud-based processing system 180 may pre-configure the gateway device 130 based on the information provided by the administrator of the PSAP 110. In another embodiment, the administrator of the cloud-based processing system 180 associates a particular gateway device 130 with the PSAP 110, e.g., based on a serial number of the gateway device 130. When the gateway device 130 initially connects to the IP-based network 170, the provisioning engine 250 transmits information identifying the gateway device 130 (e.g., the serial number of the gateway device 130) to the cloud-based processing system 180, the cloud-based processing system 180 correlates the identifying information to the previously-provided CHE configuration information. The cloud-based processing system 180 transmits configuration instructions, including the parsing instructions for the CHE 120, to the gateway device 130 based on the previously-provided CHE configuration information.

The status engine 260 provides status updates to the cloud-based processing system 180 regarding the gateway device 130 and/or the CAD server 120. For example, the status engine 260 calculates metrics describing operations of the gateway device 130, e.g., number of data messages received, number of data messages processed, processing time, queue size, etc., and transmits the metrics to the cloud-based processing system 180 via the IP interface 240. As another example, the status engine 260 monitors connectivity and functionality of all CHE 120 to which it is connected. The status engine 260 may be configured to detect errors in the connectivity and/or functionality of the CHE 120 and transmit alerts to the cloud-based processing system 180. The cloud-based processing system 180 can update the dispatcher or an administrator at the PSAP 110 so that they can quickly address any issues with the CHE 120.

In some embodiments, the status engine 260 can additionally or alternatively provide status information about the gateway device 130 and/or the CHE 120 to a local user at the PSAP 110 via a status user interface. The status engine 260 may provide the status user interface to an integrated display of the gateway device 130, or to a display connected to the gateway device 130.

Figure 3:
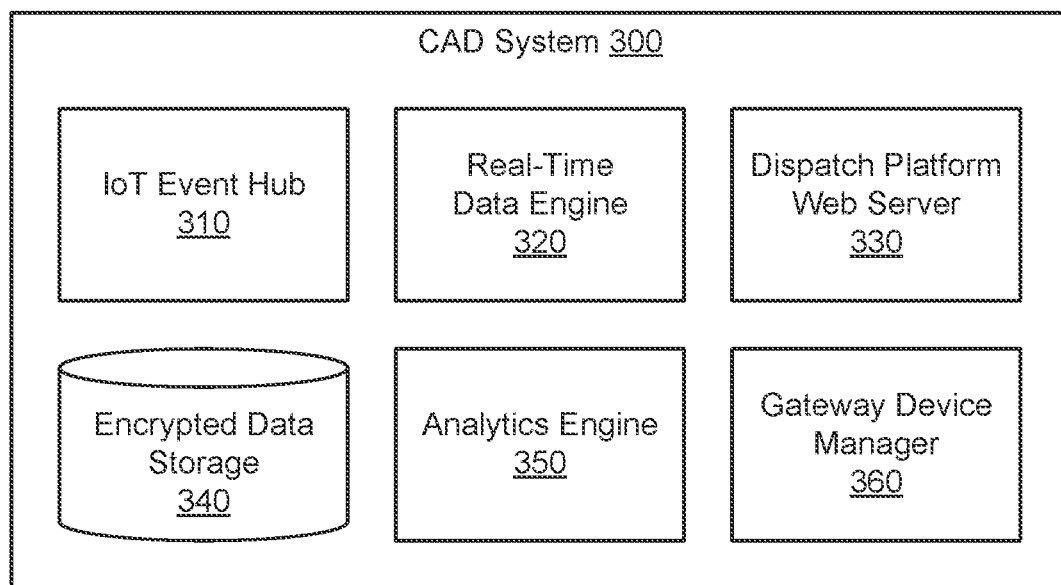
FIG. 3 is a block diagram of a cloud-based CAD system, according to an embodiment.

FIG. 3 is a block diagram of a CAD system 300, according to an embodiment. The CAD system 300 is an embodiment of the cloud-based processing system 180. The gateway device 130 includes an IoT event hub 310, a real-time data engine 320, a dispatch platform web server 330, an encrypted data storage 340, an analytics engine 350, and a gateway device manager 360. In alternative configurations, different and/or additional components may be included in the CAD system 300. As one alternative, a cloud-based processing system that does not provide a CAD service may include the IoT event hub 310, the real-time data engine 320, the encrypted data storage 340, the analytics engine 350, and the gateway device manager 360. Additionally, functionality described in conjunction with one or more of the components shown in FIG. 3 may be distributed among the components in a different manner than described in conjunction with FIG. 3 in some embodiments.

The IoT event hub 310 receives and processes data messages describing call events from a set of gateway devices, such as gateway device 130, connected to the CAD system 300 via the IP-based network 170. In one embodiment, the gateway device 130 is configured to transmit different types of data messages received from the CHE 120, such as the real-time messages described above, and data messages that provide summary information describing one or more calls. In this embodiment, the IoT event hub 310 determines the message type, e.g., based on a flag, or based on the formatting of the message. The IoT event hub 310 then routes each data message based on its message type. For example, the IoT event hub 310 routes real-time messages to the real-time data engine 320, and routes summary data to the analytics engine 350. The IoT event hub 310 also routes data messages to the encrypted data storage 340, from which the analytics engine 350 retrieves the data for analysis.

The real-time data engine 320 performs real-time processing of data messages during an emergency call. The real-time data engine 320 parses the data messages, including extracting the dispatcher position, the location information, caller phone number, caller name, and other available information. The real-time data engine 320 may retrieve additional data about the call or the caller as available based on the extracted data. For example, the real-time data engine 320 may retrieve additional location information, information about previous calls, medical history information, etc. from the encrypted data storage 340 or other data sources. The real-time data engine 320 provides data about the caller that may be used by the dispatcher to the dispatcher platform web server 330.

The dispatcher platform web server 330 is a web server that provides a call-taking and dispatch interface to the dispatcher CAD device 140. As described with respect to FIG. 1, the dispatcher CAD device 140 may execute a browser that accesses a web site provided by the dispatch platform web server 330. The dispatch platform web server 330 maintains information identifying each dispatcher accessing the CAD system 300, such as a PSAP identifier and the position number within the PSAP. The dispatch platform web server 330 routes data received from the real-time data engine 320 to the appropriate dispatcher by matching the PSAP identifier and position number extracted from the data messages to the PSAP identifier and position number of the dispatcher CAD device 140 used by the dispatcher to which the CHE 120 routed the call.

The encrypted data storage 340 provides long term storage of the data messages for analysis of the call event data. The encrypted data storage 340 may include one or more of a Binary Large OBject (BLOB) storage service, data warehouse, key-value database, document database, relational database, or any other type of data storage. In some embodiments, call event data is stored in multiple different databases, which are used for different types of analysis. For example, the IoT event hub 310 may store real-time data in one database of the encrypted data storage 340, and store summary data in a different database of the encrypted data storage 340.

The analytics engine 350 analyzes the call event data received from gateway devices, such as gateway device 130, and provides the results of the analytics to PSAP administrators, state or regional agencies overseeing emergency response, administrators of the CAD system 300, or other authorized parties. In addition to data from gateway devices, the analytics engine 350 may also analyze data received from other sources, such as data provided dispatchers received via the dispatcher CAD device 140, data provided by emergency responders, social media data, other service providers, other 911 systems, location data sources, etc., and incorporate these data sources into various reports. The real-time reports may be provided by the dispatch platform web server 330 or by a separate web server that provides analytics interfaces.

In some embodiments, the analytics engine 350 provides real-time data streaming and analysis based on real-time call event data received at the IoT event hub 310 and passed directly to the analytics engine 350. For example, the analytics engine 350 may provide dashboards describing real-time call data to administrators (e.g., an administrator of a PSAP, or an administrator of a group of PSAPs, such as county, state, or regional emergency personnel). A real-time dashboard may provide data summarizing locations of incidents; incident numbers broken down by time of day, day of week, type of incident, or other factors; incident response times, such as incident registration time, time to scene, time on scene, time to hospital; data describing the emergency calls, such as call duration, call transfers, dispatcher utilization, answer time; or other types of data of potential interest to administrators.

In some embodiments, analytics engine 350 retrieves call event data from the encrypted data storage 340 and provides periodic reports to PSAP or emergency administrators, or administrators of the CAD system 300. For example, the analytics engine 350 can generate reports summarizing PSAP utilization, call routing, dispatch performance, wireless location accuracy, and outages. Such reports may be automatically generated and sent to PSAPs or other administrators on a daily, weekly, or monthly basis, or on some other periodic basis.

The gateway device manager 360 manages provisioning, updating, and maintaining the gateway devices, such as gateway device 130, connected to the CAD system 300. The gateway device manager 360 performs on-demand provisioning of gateway devices during their initial configuration. For example, during initial configuration process, the gateway device manager 360 receives information transmitted by the provisioning engine 250 of the gateway device 130 that describes the environment of the gateway device 130. As described with respect to FIG. 2, this information may include data describing the CHE 120 to which the gateway device 130 is connected, such as vendor and product information, one or more sample data messages, information identifying the PSAP 110, information input by a PSAP administrator, or other information that the gateway device manager 360 can use to ascertain the data output format of the CHE 120. The gateway device manager 360 selects parsing instructions based the data output format of the CHE 120 and transmits the selected parsing instructions to the provisioning engine 250. In some embodiments, the gateway device manager 360 also transmits formatting instructions along with the parsing instructions, and/or other instructions used by the gateway device 130 during operation. The gateway device manager 360 may store other data describing the environment of the gateway device 130, such as the dispatcher positions in the PSAP 110, and reference this information during call events.

If the data output format of the CHE 120 is unique, in that it not used by any other CHE to which any other gateway device connected to the CAD system 300 is connected, an administrator at the CAD system 300 or the PSAP 110 may manually program the parsing instructions for the unique data output format. Advantageously, after parsing instructions for a given data output format have been programmed once, the gateway device manager 360 can provide the parsing instructions for this data output format to each gateway device 130 that receives call event data in this data output format. Therefore, in the majority of initial gateway device configurations, the gateway device manager 360 can perform on-demand provisioning nearly instantaneously without manual programming or human intervention at the CAD system 300, and with minimal effort at the PSAP 110. For example, at the PSAP, an administrator may simply connecting the gateway device 130 to the CHE 120 and IP-based network 170, and the provisioning engine 250 and gateway device manager 360 automatically configure the gateway device 130.

After initial provisioning, the gateway device manager 360 may send periodic software updates to the gateway device 130. In addition, the gateway device manager 360 may monitor the connected gateway devices for status updates. For example, the gateway device manager 360 may receive various alerts provided by the telemetry engine 260 regarding the health of the gateway device 130 and the connected CHE 120. The gateway device manager 360 provides passes these alerts to the appropriate administrators at the CAD system 300, PSAP 110, or other authorized administrators or agencies.

Figure 4:
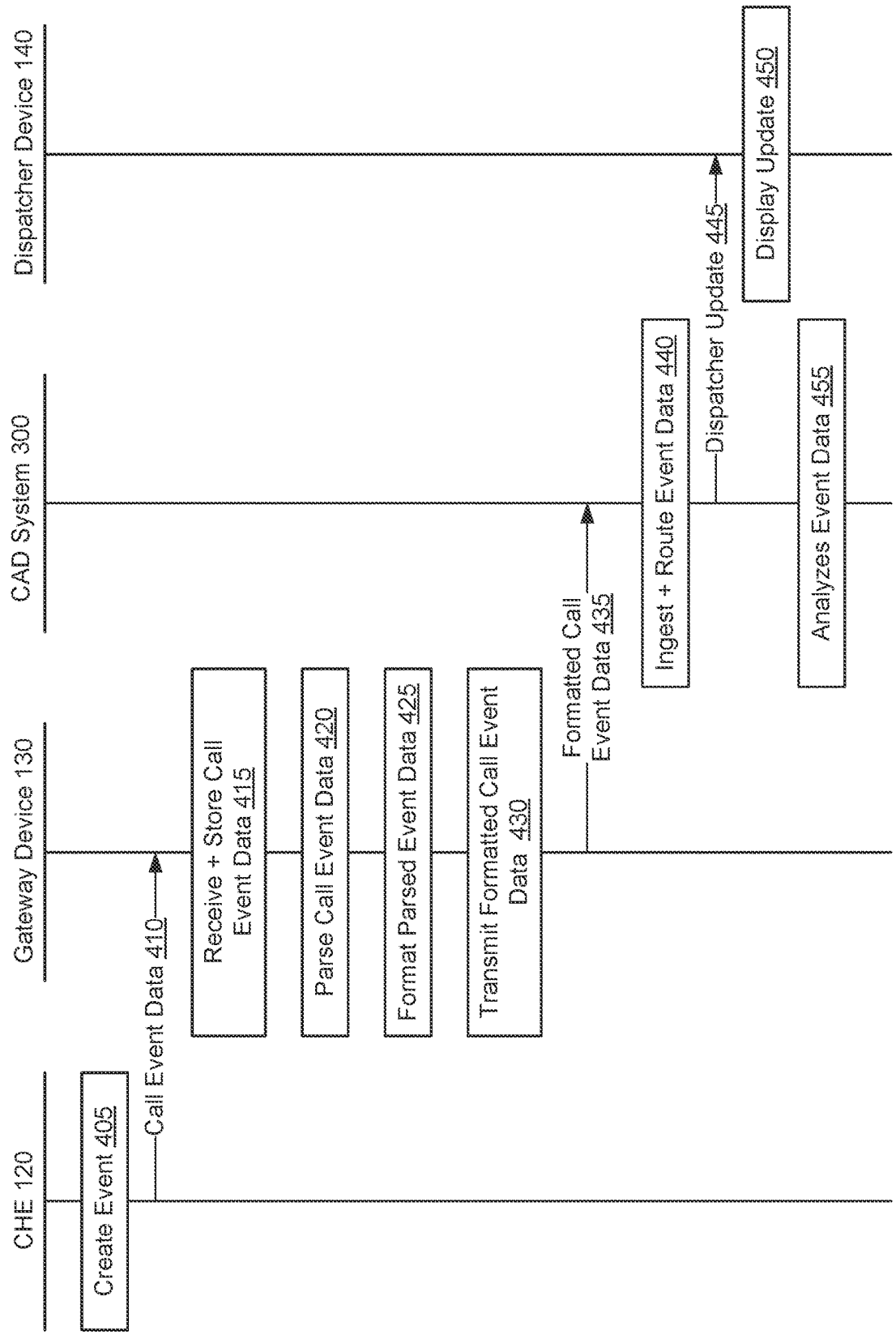
FIG. 4 is an activity diagram showing a process of getting call data from CHE to a dispatcher using the gateway device, according to an embodiment.

FIG. 4 is an activity diagram showing a process of transferring call data from CHE 120 to a dispatcher using the gateway device 130, according to an embodiment. The CHE 120 creates 405 a call event in response to receiving an emergency call, such as a call from one of the callers 160 received over the telephony network 150. The CHE 120 extracts data describing the call event, and transmits this as call event data 410 to the gateway device 130.

The gateway device 130 receives and stores 415 the call event data 410 transmitted to the gateway device 130 from the CHE 120. For example, as described with respect to FIG. 2, the gateway device 130 receives the call event data 410 at the listener interface 210, and stores the call event data 410 in a queue in the encrypted data storage 220. The gateway device 130 parses 420 the received call event data. For example, as described with respect to FIG. 2, the message parsing engine 230 retrieves the call event data from the queue in the encrypted data storage 220 and parses the call event data based on parsing instructions for parsing data from a data output format of the CHE 120. After parsing the call event data, the gateway device 130 (e.g., the message parsing engine 230) formats the parsed call event data according to the consistent data format that is used by a CAD server, such as the CAD system 300, according to instructions for formatting the parsed call event data. The gateway device 130 then transmits 430 the formatted call event data 435 to the CAD system 300. For example, as described with respect to FIG. 2, the IP interface 240 of the gateway device 130 transmits the formatted call event data to an event hub, such as the IoT event hub 310, of the CAD system 300 via the IP-based network 170.

The CAD system 300 ingests and routes 440 the formatted call event data 435 transmitted to the CAD system 300 from the gateway device 130. For example, as described with respect to FIG. 3, the IoT event hub 310 ingests and routes the formatted call event data 435. For example, the IoT event hub 310 routes the data to the real-time data engine 320. The IoT event hub 310 may also route received data messages to encrypted data storage 340 and/or the analytics engine 350.

The CAD system 300 transmits a dispatcher update 445 to the dispatcher CAD device 140. For example, the real-time data engine 320 extracts data that can be used by the dispatcher (e.g., callback number, service provider, location, etc.) from the formatted call event data 435 and passes the extracted data to the dispatch platform web server 330. The dispatch platform web server 330 transmits the dispatcher update 445 to the dispatcher CAD device 140, e.g., in a user interface provided by the CAD system 300 via a browser or application. The dispatcher CAD device 140, running a browser or other application for accessing data from the CAD system 300, displays 450 the dispatcher update 445 in a user interface to a dispatcher.

In addition to providing the dispatcher update 445, the CAD system 300 analyzes 455 the ingested call event data. For example, as described with respect to FIG. 3, the analytics engine 350 of the CAD system 300 performs real-time analysis on call events for a PSAP or group of PSAPs and provides interfaces with real-time data. As another example, the analytics engine 350 periodically analyzes call event data received over a period of time and provides periodic reports to administrators.

Figure 5:
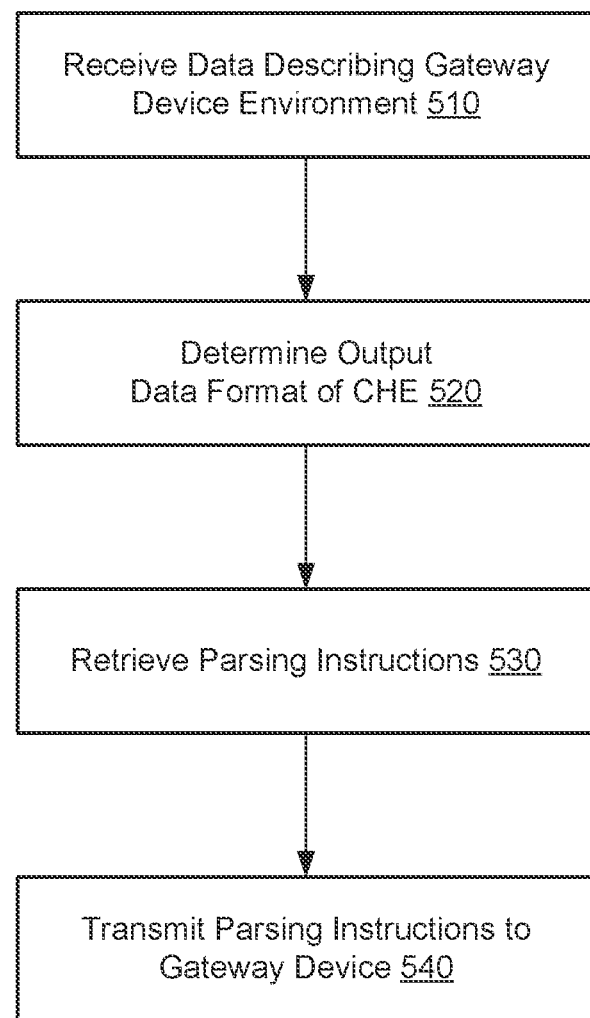
FIG. 5 is a flowchart showing a process of provisioning a gateway device, according to an embodiment.

FIG. 5 is a flowchart showing a process 500 of provisioning a gateway device, according to an embodiment. The steps of the process 500 may be performed by the CAD system 300, and in particular, by the gateway device manager 360, as described below. Alternatively, the steps of the process 500 may be performed by any cloud-based processing system 180, such as a gateway device manager of a cloud-based analytics system. Some or all of the steps may be performed by other modules in other embodiments. In addition, other embodiments may include different and/or additional steps and the steps may be performed in different orders.

The gateway device manager 360 receives 510 data describing the environment of the gateway device 130. For example, the provisioning engine 250 provides data describing the environment of the gateway device 130, such as the number of CHE devices that provide emergency call data, and data that can be used to determine the output data format of the CHE. The provisioning engine 250 may provide this information to the gateway device manager 360 via an Internet connection.

The gateway device manager 360 determines an output data format of a plurality of data formats for the CHE based on the data describing the local environment. For example, if the gateway device manger 360 received product information identifying the CHE (e.g., vendor, product, versioning information), the gateway device manager 360 identifies an output data format based on this product information. As another example, if the gateway device manager 360 received a sample data message from the CHE 120, the gateway device manager 360 may compare this sample data message to one or more other data messages received from other gateway devices to determine the data output format.

The gateway device manager 360 retrieves 530 instructions for parsing data from the output data format and formatting the parsed data to the consistent format. For example, the gateway device manager 360 may store parsing and formatting instructions for various data output formats, and retrieve the appropriate set of parsing and formatting instructions based on the determined data output format. If at least one other gateway device connected to the CAD system 300 receives data messages in the determined output format, the gateway device manager 360 stores and can quickly retrieve these instructions. In some embodiments, the formatting instructions may be the same for each output data format. Alternatively, the formatting instructions may vary based on the output data format, e.g., if some CHE provides data fields that other CHE does not.

The gateway device manager 360 transmits 540 the retrieved instructions to the gateway device 130 over the Internet connection. The gateway device 130 stores the instructions and, during operation, uses the instructions to parse and format data messages received from the CHE 120.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a gateway device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for processing emergency call data comprising:
    receiving a data message output by call handling equipment (CHE), the data message comprising emergency call data and formatted according to a data output format, the data message associated with an emergency call being handled by the CHE;
    parsing the data message according to parsing instructions for parsing data messages in the data output format to extract at least a portion of the emergency call data; and
    providing at least a portion of the extracted emergency call data for display to an emergency dispatcher.

2. The method of claim 1, further comprising formatting the extracted emergency call data according to a data format used by a cloud-based processing system and transmitting the formatted data to the cloud-based processing system.

3. The method of claim 1, wherein the data output format is one data output format of a plurality of data output formats.

4. The method of claim 1, wherein the parsing instructions are identified for the data output format based on a local environment of the CHE.

5. The method of claim 1, wherein a server receives the data message from a device coupled to the CHE.

6. The method of claim 1, wherein parsing the data message comprises extracting a dispatcher position to which the CHE has routed the emergency call.

7. The method of claim 6, wherein providing the portion of the extracted emergency call data for display comprises providing a dispatcher-specific user interface for the dispatcher associated with the dispatcher position, the dispatcher-specific user interface comprising emergency call data for emergency calls associated with the dispatcher position.

8. The method of claim 1, wherein parsing the data message comprises extracting a phone number associated with the emergency call and a location associated with the emergency call.

9. The method of claim 1, wherein the portion of the extracted emergency call data is provided for display by a cloud-based processing system that is not co-located with the CHE.

10. The method of claim 1, wherein the data message is parsed by a gateway device co-located with the CHE.

11. A non-transitory computer-readable storage medium storing computer program instructions executable by a processor to perform operations for processing emergency call data, the operations comprising:
    receiving a data message output by call handling equipment (CHE), the data message comprising emergency call data and formatted according to a data output format, the data message associated with an emergency call being handled by the CHE;
    parsing the data message according to parsing instructions for parsing data messages in the data output format to extract at least a portion of the emergency call data; and
    providing at least a portion of the extracted emergency call data for display to an emergency dispatcher.

12. The non-transitory computer-readable storage medium of claim 11, the operations further comprising formatting the extracted emergency call data according to a data format used by a cloud-based processing system and transmitting the formatted data to the cloud-based processing system.

13. The non-transitory computer-readable storage medium of claim 11, wherein the data output format is one data output format of a plurality of data output formats.

14. The non-transitory computer-readable storage medium of claim 11, wherein the parsing instructions are identified for the data output format based on a local environment of the CHE.

15. The non-transitory computer-readable storage medium of claim 11, wherein a server receives the data message from a device coupled to the CHE.

16. The non-transitory computer-readable storage medium of claim 11, wherein parsing the data message comprises extracting a dispatcher position to which the CHE has routed the emergency call.

17. The non-transitory computer-readable storage medium of claim 16, wherein providing the portion of the extracted emergency call data for display comprises providing a dispatcher-specific user interface for the dispatcher associated with the dispatcher position, the dispatcher-specific user interface comprising emergency call data for emergency calls associated with the dispatcher position.

18. The non-transitory computer-readable storage medium of claim 11, wherein parsing the data message comprises extracting a phone number associated with the emergency call and a location associated with the emergency call.

19. The non-transitory computer-readable storage medium of claim 11, wherein the portion of the extracted emergency call data is provided for display by a cloud-based processing system that is not co-located with the CHE.

20. The non-transitory computer-readable storage medium of claim 11, wherein the data message is parsed by a gateway device co-located with the CHE.

* * * * *